United States Patent
Hillers

(10) Patent No.: US 9,994,149 B2
(45) Date of Patent: Jun. 12, 2018

(54) SOUND TRANSMITTING SYSTEM FOR A MOTOR VEHICLE AND METHOD FOR A SOUND TRANSMITTING SYSTEM

(71) Applicant: Dr. Ing. h.c. F. Porsche Aktiengesellschaft, Stuttgart (DE)

(72) Inventor: Tobias Hillers, Gerlingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days. days.

(21) Appl. No.: 15/203,878

(22) Filed: Jul. 7, 2016

(65) Prior Publication Data
US 2017/0008453 A1    Jan. 12, 2017

(30) Foreign Application Priority Data
Jul. 8, 2015  (DE) .................. 10 2015 111 054

(51) Int. Cl.
*G10K 11/22* (2006.01)
*B60Q 9/00* (2006.01)
*G10K 11/18* (2006.01)

(52) U.S. Cl.
CPC ............. *B60Q 9/00* (2013.01); *G10K 11/22* (2013.01)

(58) Field of Classification Search
CPC .... F02M 35/1294; G10K 11/22; G10K 11/18; G10K 15/04; G10K 9/04; B60Q 5/00; B60Q 9/00; H04B 1/082
USPC ........................................................ 181/229
See application file for complete search history.

(56) References Cited

U.S. PATENT DOCUMENTS

| 5,237,617 A * | 8/1993 | Miller ........... G09B 9/05 381/61 |
| 5,635,903 A * | 6/1997 | Koike ........... A63H 17/34 340/384.1 |
| 7,353,791 B2 * | 4/2008 | Sasaki ........... F02M 35/10019 123/184.53 |

(Continued)

FOREIGN PATENT DOCUMENTS

| DE | 44 35 296 | 4/1996 |
| DE | 197 04 376 | 8/1998 |

(Continued)

OTHER PUBLICATIONS

German Search Report dated Apr. 5, 2016.
Japanese Office Action dated May 30, 2017.

*Primary Examiner* — Edgardo San Martin
(74) *Attorney, Agent, or Firm* — Gerald E. Hespos; Michael J. Porco; Matthew T. Hespos

(57) ABSTRACT

A sound transmitting system for a motor vehicle has a sound generator (2) and a sound-conducting first sound duct (6). The first sound duct (6) has a proximal end (7) connected to the sound generator (2) to transmit sound and a distal end (21) facing away from the proximal end (7) and via which a sound from the generated sound enters a passenger compartment (19) or external region (20) of a bodywork (26) of the motor vehicle (12). To bring about a specific sound characteristic of the resulting sound, a first length (L1) of the first sound duct (6) and/or a first diameter (D1) of the first sound duct (6) and/or a first cross-sectional area (Q1) of the first sound duct (6) are/is adapted as a function of the generated sound.

9 Claims, 2 Drawing Sheets

(56) References Cited

U.S. PATENT DOCUMENTS

| | | | | |
|---|---|---|---|---|
| 7,621,370 B2* | 11/2009 | Abe | ............... | F02M 35/10137 |
| | | | | 123/184.57 |
| 7,650,001 B2* | 1/2010 | Yasushi | ............... | B60Q 5/008 |
| | | | | 381/61 |
| 8,127,888 B1* | 3/2012 | Mah | ............... | F02M 35/1216 |
| | | | | 123/184.53 |
| 8,284,948 B2* | 10/2012 | Kuroiwa | ............... | G10K 15/02 |
| | | | | 340/384.3 |
| 8,730,027 B2* | 5/2014 | Saito | ............... | B60Q 5/008 |
| | | | | 340/384.1 |
| 8,955,455 B2* | 2/2015 | Tanaka | ............... | B60Q 5/008 |
| | | | | 116/28 R |
| 9,096,165 B2* | 8/2015 | Grosse-Budde | ....... | B60Q 5/008 |
| 2004/0094112 A1 | 5/2004 | Hoffmann et al. | | |
| 2005/0133300 A1* | 6/2005 | Hofmann | ............ | F02M 35/1294 |
| | | | | 181/250 |
| 2005/0175186 A1* | 8/2005 | Yasushi | ............... | B60Q 5/008 |
| | | | | 381/61 |
| 2007/0186895 A1* | 8/2007 | Ochi | ............... | F02M 35/14 |
| | | | | 123/198 E |
| 2010/0245069 A1* | 9/2010 | Noro | ............... | B60Q 5/008 |
| | | | | 340/441 |
| 2011/0192368 A1* | 8/2011 | Becker | ............... | F02M 35/1294 |
| | | | | 123/184.21 |
| 2014/0055258 A1 | 2/2014 | Grosse-Budde | | |
| 2014/0328494 A1 | 11/2014 | Pommerer et al. | | |
| 2015/0036840 A1 | 2/2015 | Sulowski et al. | | |

FOREIGN PATENT DOCUMENTS

| | | | | |
|---|---|---|---|---|
| DE | 100 42 012 | | 5/2001 | |
| DE | 101 14 397 | | 9/2002 | |
| DE | 10 2010 005 067 | | 7/2011 | |
| DE | 10 2012 003 769 | | 7/2013 | |
| DE | 10 2012 107 814 | | 5/2014 | |
| DE | 10 2013 208 098 | | 11/2014 | |
| DE | 102015106000 A1 * | 10/2016 | ............... B60Q 5/00 | |
| JP | H08006575 A | | 1/1996 | |
| JP | 2007100677 A | | 4/2007 | |
| JP | 2008-62718 | | 3/2008 | |
| JP | 2014218242 A | | 11/2014 | |
| WO | 2012/053043 | | 4/2012 | |

* cited by examiner

SOUND TRANSMITTING SYSTEM FOR A MOTOR VEHICLE AND METHOD FOR A SOUND TRANSMITTING SYSTEM

CROSS REFERENCE TO RELATED APPLICATION

This application claims priority under 35 USC 119 to German Patent Appl. No. 10 2015 111 054.7 filed on Jul. 8, 2015, the entire disclosure of which is incorporated herein by reference.

BACKGROUND

1. Field of the Invention

The invention relates to a sound transmitting system for a motor vehicle and to a method for a sound transmitting system.

2. Description of the Related Art

Sound transmitting systems for motor vehicles that transmit various sounds of the motor vehicle into a passenger cell of the motor vehicle or to the outside are known. These systems function to shape the sound level and the sound characteristic in the passenger cell as a function of a current state of a motor vehicle. As a result, acoustic sounds of the internal combustion engine are conveyed to the driver despite the insulation of the passenger cell.

This is to be considered against the background of small and increasingly quiet drive assemblies of the motor vehicle. As a result, the driver of the motor vehicle is no longer immediately made aware of a current state of the vehicle by the sound that enters the passenger cell.

DE 10 2013 208 098 A1 discloses a sound transmitting system for a motor vehicle that has a sound generator. The sound generator is connected to a sound duct that connects the sound generator acoustically and fluidically to an irradiation space. The control unit of the motor vehicle controls the sound generator as a function of a driving state of the motor vehicle.

DE 10 2012 107 814 A1 describes a sound transmitting system for a motor vehicle that is based on a sound generator and passes on the sound generated thereby to a sound irradiation device, for example in the form of a loud speaker. The sound irradiation device is connected to at least one sound duct that leads from the sound irradiation device into the passenger cell.

WO 2012/053043 A1 discloses a sound transmitting system with a sound generator having vibration actuators. The vibration actuators are activated as a function of a current driving state of the motor vehicle. Sound waves are generated and are emitted at the ends of the sound generator.

DE 10 2012 003 769 B3 discloses a sound transmitting system in the form of a loudspeaker system for a motor vehicle. The loudspeaker system comprises a loudspeaker arranged outside the passenger cell, but connected acoustically to the passenger cell via a sound duct. The sound duct has a sound insulating device for reducing or preventing a transmission of undesired or destructive sounds.

DE 10 2010 005 067 A1 discloses a sound transmitting system for a motor vehicle and has sound ducts for inputting sounds of an exhaust gas turbocharger and/or of an intake air filter and/or of an end silencer. The sound ducts have control valves that can be used to influence the degree of transmission of sound of the sound ducts.

JP 2008-062718 discloses a sound transmitting system for a motor vehicle, having two sound ducts that open into the passenger cell of the motor vehicle. The respective junction ends of the sound ducts are at the same distance from the point in the passenger compartment seat within the passenger cell.

An object of the invention is to provide an improved sound transmitting system for a motor vehicle and a corresponding method for a sound transmitting system.

SUMMARY

A sound transmitting system for a motor vehicle in accordance with the invention has a sound generator and a sound-transmitting first sound duct that is designed to transmit a sound generated by the sound generator. The first sound duct has a proximal end connected to the sound generator. The first sound duct also has a distal end facing away from the proximal end and via which a sound that results from the generated sound enters a passenger compartment or external region of a bodywork of the motor vehicle. At least one of a first length of the first sound duct and/or a first diameter of the first sound duct and/or a first cross-sectional area of the first sound duct is adapted as a function of the generated sound to bring about a specific sound characteristic of the resulting sound.

The sound generated by the sound generator and transmitted into the passenger compartment and/or the external region is influenced by a defined geometry of the first sound duct. The geometry, that is to say the length, the diameter and the cross-sectional area of the sound duct, determines a transmission characteristic and frequency characteristic of the sound duct. By virtue of a specific, defined geometry of the first sound duct, resonances brought about in the first sound duct can be used effectively and in a targeted way. Thus, proceeding from the generated sound, the effective sound that can be perceived at the end in the passenger compartment and/or external region has a specific, predefined sound characteristic. Resonances that amplify specific sound portions of the effective sound also can be emphasized.

A further advantage is that a sound generator that is essentially of the same design can be used over a multiplicity of motor vehicles, and the sound that is to be transmitted is adapted by the geometry of the first sound duct. As a result, the sound transmitting system of the invention can be used in accordance with a cost-effective modular design of contemporary motor vehicles.

The sound transmitting system may comprise a second sound duct with a second length, a second diameter and a second cross-sectional area. The second sound duct has a proximal end connected to the sound generator to transmit sound. The lengths of the sound ducts can be adapted to one another so that musical principles with respect to harmonic behavior or chords can be taken into account. For example a phase offset can be generated at junctions of sound ducts of the same length, the phase offset can be used positively. Sound ducts of different lengths can be used, and the lengths can be adapted so that the resonances that are emphasized can be tuned to specific dyads or triads.

The sound generator may have an adjustable actuator for generating sound. The actuator is designed to generate an oscillating movement. The adjustability provides a further degree of freedom of the generation of sound. The sound can be generated by the actuator as a function of different rules that can be determined freely. In this instance, the actuator can, for example, bring about the generation of sound according to an operating behavior of the drive assembly or adapted to a state of the vehicle.

Simple sound generation is provided if the actuator is designed so as to move a diaphragm of the sound generator. The diaphragm is moved with the aid of the actuator and is excited to oscillate or made to oscillate. As a result of the oscillation, an air pressure wave is produced, which is also referred to as air pressure oscillation or as sound wave. The air pressure wave enters the sound ducts at the proximal ends thereof that are held at the sound generator. The air pressure wave then is guided into the passenger compartment or external region via the sound ducts and is perceived as sound.

The actuator may be activated with the aid of an open-loop and closed-loop control system of the motor vehicle. This configuration advantageously permits the sound formed by the sound generator to be influenced selectively. Thus, the sound that is to be generated can be actively generated and also changed.

A further advantage of this refinement is mechanical isolation of the sound transmitting system from the drive assembly, which is in contrast to sound symposers that are coupled mechanically to the drive assembly via the sound ducts. This isolation can achieve package advantages, since the sound transmitting system can be accommodated in the motor vehicle independently of the drive assembly. Furthermore, the invention avoids possible reactions of a mechanical coupling of the sound transmitting system to the drive assembly, which, in certain circumstances, can have an adverse effect on a load change of a drive assembly, such as an internal combustion engine or combustion engine.

The activation of the actuator with the aid of the open-loop and closed-loop control system advantageously offers a wide spectrum of possibility for the control of the actuator. For instance, the actuator can be excited by the open-loop and closed-loop control system as a function of current driving operating data if the open-loop and closed-loop control system is connected to a bus, such as a CAN bus or FlexRay bus, and current driving operating data are exchanged between the bus and the open-loop and closed-loop control system. Thus, if the open-loop and closed-loop control system is connected to the bus, journey state variables such as speed, engine rotation speed, load, are received via this connection, and the actuator operates as a function of these data.

The actuator also may be operated as a function of oscillations of the intake section and/or the exhaust tract of the drive assembly. For this purpose, a measuring element may be connected to the open-loop and closed-loop control system for picking up the oscillations. Thus, the actuator can be operated as a function of real oscillations that are passed on in the form of measurement data to the open-loop and closed-loop control system, and then transmitted directly to the actuator to operate it. These measurement data also can be changed by the open-loop and closed-loop control system.

The actuator also can be operated with the aid of a characteristic diagram that is formed in the open-loop and closed-loop control system. With this possibility, for example the signals recorded in the open-loop and closed-loop control system are used, and can be mapped, for example, in a load-speed characteristic diagram.

The sound duct may be formed from a plastic. Since the transmission characteristic and frequency characteristic are also dependent on the selected sound duct material, it is possible to provide a cost-effective sound transmitting system through suitable selection of the sound duct material and by taking into account the geometric variables. A low overall weight and cost-effective manufacture of the sound transmitting system also arise as a result of the formation of the sound ducts from a plastic. For example, at least partial regions of the sound ducts that have ends can be elastic. Therefore, simple mounting of the sound ducts on the housing or on the tubular sections of the housing can be achieved. For the purpose of mounting, the partial regions can first be widened by applying a stretching force to draw them over the pipelines. When they have reached the corresponding position on the pipelines, the stretching force is removed and the partial regions can retract again and form a tight connection to the tubular flanges.

An end of the sound duct may lead into a passenger cell of the motor vehicle. Thus, sound generated by the sound generator advantageously can be perceived directly by the driver of the motor vehicle.

An end of the sound duct may lead into an external region. This has the advantage that the sound generated by the sound generator can be perceived directly by other road users. The motor vehicle may be an electric vehicle with sounds that usually are significantly lower than the sounds of a motor vehicle operated by an internal combustion engine. Thus, sound directed from the duct to the external region can alert the other road users to the motor vehicle.

The sound generator advantageously may be manufactured from a plastic to reduce manufacturing costs and weight.

A further aspect of the invention relates to a method for a sound transmitting system, having a sound generator and a sound-conducting first sound duct. The first sound duct is designed to transmit a sound generated by the sound generator. A proximal end of the first sound duct is connected to the sound generator to transmit sound. A distal end of the first sound duct faces away from the proximal end and delivers a sound from the generated sound to a passenger compartment or external region of a bodywork of the motor vehicle. To influence a sound characteristic of the resulting sound, a first length of the first sound duct and/or a first diameter of the first sound duct and/or a first cross-sectional area of the first sound duct are/is adapted.

The advantage is that a transmission characteristic and frequency characteristic of the sound duct are determined by a definable geometry of the sound duct, that is to say the length, the diameter and the cross-sectional area of the sound duct. It is therefore possible for resonances that are brought about in the first sound duct to be used effectively and in a targeted fashion so that, on the basis of the generated sound, the effective sound that can be perceived at the end in the passenger compartment and/or external region has a specific, predefined sound characteristic. Resonances that amplify specific sound portions of the effective sound can be emphasized.

A second sound duct may be provided and has a second length, a second diameter and a second cross-sectional area. The second sound duct has a proximal end connected to the sound generator to transmit sound, and the second length and/or the second diameter and/or the second cross section is/are adapted, the geometric parameters length, diameter and cross-sectional area can be matched to one another in such a way that musical principles with respect to harmonic behavior or, for example chords, can be taken into account.

In a further refinement of the method, the sound generator is connected to an open-loop and closed-loop control system of the motor vehicle, and data of the open-loop and closed-loop control system are used to generate sound. The data of the open-loop and closed-loop control system can be, for example, signals supplied by a bus, and the data can also be embodied in the form of characteristic diagram data.

Further advantages, features and details of the invention can be found in the following description of preferred exemplary embodiments and with reference to the drawing. The features and combinations of features that are specified above in the description as well as the features and combinations of features that are specified below can be used in the respectively specified combination and also in other combinations or alone, without departing from the scope of the invention. Identical or functionally identical elements are assigned identical reference symbols. For reasons of clarity, it is possible that the elements are not provided with their reference symbol in all the figures.

BRIEF DESCRIPTION

DETAILED DESCRIPTION

Figure 1:
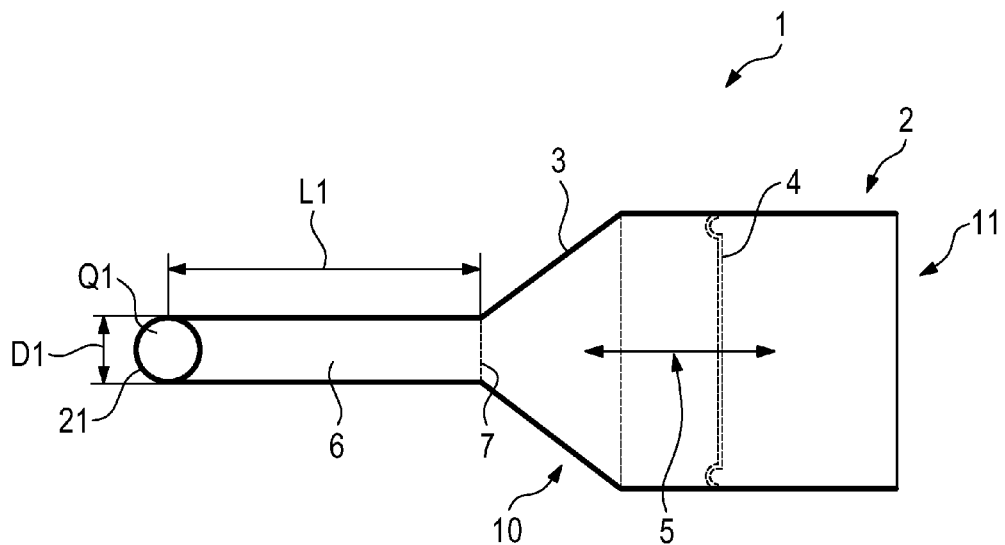
FIG. 1 shows a schematic illustration of a sound transmitting system according to the invention in a first exemplary embodiment.

A sound transmitting system according to a first embodiment of the invention is identified by the numeral 1 in FIG. 1. The sound transmitting system 1 has a sound generator 2 with a housing 3 and a diaphragm 4 held in the housing 3. The sound transmitting system 1 also has an actuator 5 that excites the diaphragm 4 and causes the diaphragm to oscillate. The diaphragm 4 is circular and the entire circumference is secured in the housing 3. The diaphragm 4 could have other shapes, for example ellipsoidal or polygonal. An outer contour of the diaphragm 4 and an inner contour of the housing 3 are preferably have complementary shapes in the region in which the diaphragm 4 is held.

Sound waves, air pressure waves or air pressure oscillations are generated in the housing 3 when the diaphragm 4 oscillates. The housing 3 is connected to a first sound duct 6 to transmit the sound waves in a sound-conducting fashion. The first sound duct 6 is a tube and the sound waves are transmitted both in the form of a solid-borne sound and in the form of an air-borne sound through the tube 6.

The first sound duct 6 has a proximal end 7 connected in a sound-conducting fashion to the housing 3, and also has a first length L1, a first diameter D1 and a first cross-sectional area Q1.

Figure 2:
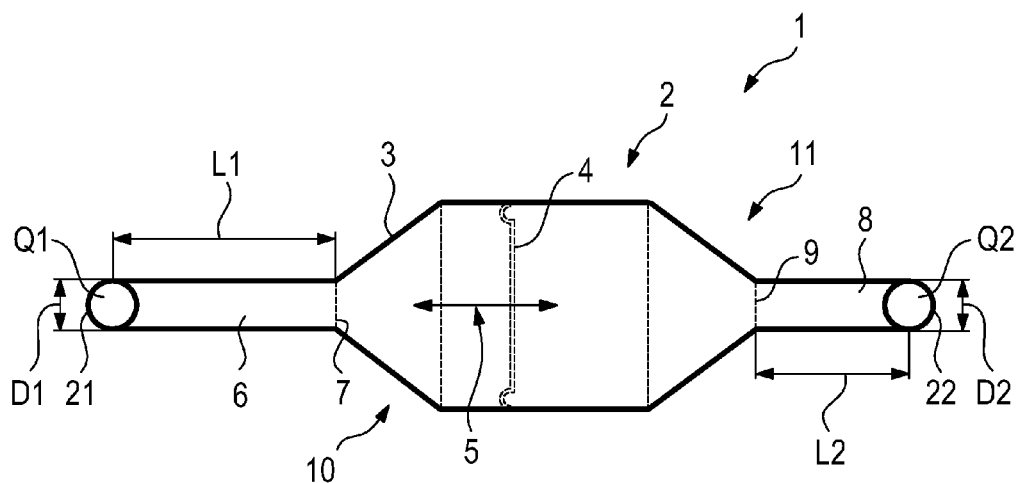
FIG. 2 shows a schematic illustration of the sound transmitting system according to the invention in a second exemplary embodiment.

FIG. 2 illustrates a second embodiment of the sound transmitting system 1 of the invention. The sound transmitting system 1 of FIG. 2 has first and second sound ducts 6 and 8. The second sound duct 8 has a proximal end 9 connected in a sound-conducting fashion to the housing 3. The second sound duct 8 has a second length L2, a second diameter D2 and a second cross-sectional area Q2.

It is not absolutely necessary for the first sound duct 6 and the second sound duct 8 to be held coaxially on the housing 3, as illustrated in FIG. 2. Likewise, it is not absolutely necessary for the first and second sound ducts 6 and 8 to be held on oppositely facing sides 10 and 11 of the housing 3. Rather, both sound ducts 6 and 8 could be held on the side 10 or on the further side 11.

Figure 3:
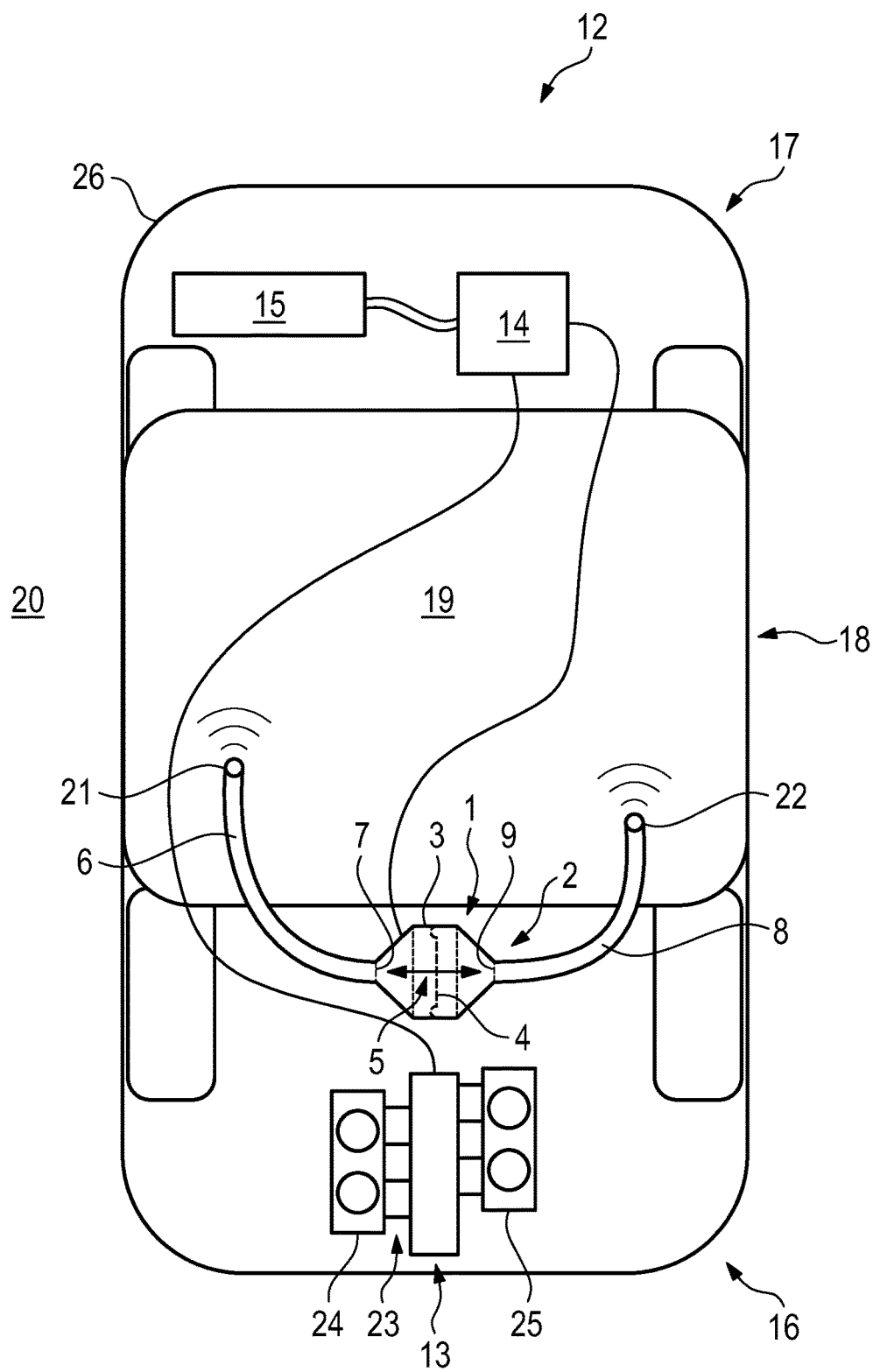
FIG. 3 shows a schematic illustration of the sound transmitting system according to FIG. 2 in a motor vehicle.

FIG. 3 illustrates the sound transmitting system 1 of FIG. 2 installed in a motor vehicle 12. The motor vehicle 12 has a drive assembly 13 in the form of a 4-cylinder internal combustion engine. The internal combustion engine is connected in a signal-transmitting fashion to an open-loop and closed-loop control system 14 of the motor vehicle 12. The transmission of signals takes place in both directions here. Thus, signals for operating the internal combustion engine 13 are transmitted from the open-loop and closed-loop control system 14 to the internal combustion engine 13 and measurement signals are transmitted from the internal combustion engine 13 to the open-loop and closed-loop control system 14, for example signals of measured pressures and/or temperatures and/or mass flow rates. The open-loop and closed-loop control system 14 preferably has a CAN bus or a FlexRay bus 15.

In the illustrated embodiment, the sound transmitting system 1 is arranged in a front region 16 of the motor vehicle 12, but could be arranged in a rear region 17 of the motor vehicle 12 or in a central region 18 of the motor vehicle 12. Transmission of sound by the sound transmitting system 1 can take place with the aid of the sound ducts 6, 8 into a passenger compartment or cell 19 and/or into an external region 20.

In the embodiment of FIG. 3, sound is transmitted into the passenger cell 19. More particularly, the first and second sound ducts 6 and 8 have distal ends 21 and 22 respectively that face away from the respective proximal ends 7 and 9. The distal ends 21 and 22 are connected to a bodywork 26 of the motor vehicle 12 and lead into the passenger cell 19 and lead into the passenger cell 19. Thus, air pressure oscillations generated by the diaphragm 4 with the aid of the actuator 5 are transmitted into the passenger cell 19.

The first and second sound ducts 6 and 8 are connected independently of one another to the bodywork 26. Additionally, the first and second sound ducts 6 and 8 have cross-sectional areas Q1, Q2 that are identical or congruent. Likewise, the diameters D1, D2 of the sound ducts 6, 8 are identical. The first length L1 of the first sound duct 6 is longer than the second length L2 of the second sound duct 8 to bring about a harmonic sound in the passenger cell 19.

In an alternate embodiment, the lengths L1, L2 and the diameters D1, D2 are identical, but the cross-sectional areas Q1, Q2 are not congruent, so that harmonic chords are brought about.

The first and second sound ducts 6 and 8 are connected in a sound-conducting fashion at different locations to the bodywork 26. For example, the first and second sound ducts 6 and 8 may be held at an A pillar of the bodywork 26 with the aid of a plug-type connection.

If the distal ends 21 and/or 22 lead into the external region 20, the air pressure oscillations are transmitted to the external region 20.

The air oscillations or the resulting sound at the distal ends 21, 22 of the sound ducts 6, 8 are a result of the sound originally generated by the sound generator 2 and/or the air oscillations generated by the sound generator 2 and the changes in the sound or air oscillations as a function of the lengths L1, L2, the diameter D1, D2 and the shapes of the cross-sectional areas Q1, Q2. The resulting sound therefore is dependent on the geometric variables L1, L2, D1, D2, Q1, Q2.

The resulting sound also is dependent on the selected material of the sound ducts 6, 8 and their processing. The air pressure waves running through the sound ducts 6, 8 experience a different friction at a rough inner surface of the tube-like sound ducts 6, 8 than at a smooth inner surface. In other words, the resulting sound also is dependent on a surface roughness of the inner surfaces of the sound ducts 6, 8.

The solid-borne sound also is a portion of the resulting sound in addition to the air-borne sound or the air oscillations running through the sound ducts, and therefore the material of the sound ducts 6, 8 must be taken into account. Thus, sound of a sound duct 6, 8 made from plastic is different from a sound duct 6, 8 made from metal.

The actuator 5 can be adjusted and is activated by the open-loop and closed-loop control system 14, i.e. the diaphragm 4 is excited to generate the oscillation. The activation by the open-loop and closed-loop control system 14 can take place in different ways.

In one case, current driving state variables such as, for example, speed, engine rotation speed, engine load are input variables for activating the actuator 5. In this context, the correspondingly selected driving state variables are transmitted to the open-loop and closed-loop control system 14 by the bus 15 to pick up current measurement data. The actuator 5 is activated by the open-loop and closed-loop control system 14 as a function of these driving state variables. That is to say, in other words, the actuator 5 excites the diaphragm 4 as a function of the driving state variables that are used. Therefore, in the case of a high engine rotation speed, the diaphragm 4 is excited to high frequencies by the actuator 5.

In a subsequent case, a characteristic diagram can be stored in the open-loop and closed-loop control system 14 to operate the actuator 5. This characteristic diagram can be embodied in a multi-dimensional fashion. The operation of the actuator 5 therefore is carried out as a function of predetermined driving state variables that are determined during the operation of the motor vehicle 12. These driving state variables are processed in the open-loop and closed-loop control system 14, and a corresponding operating point of the actuator 5 is selected in the characteristic diagram of the actuator 5 in accordance with the driving state.

In a further case, the actuator 5 is operated as a function of a current oscillation in an intake section 23 of the drive assembly 13 and/or of an exhaust tract, for example of an intake duct of the intake section 23 or an exhaust gas duct of the exhaust tract. These oscillations are registered by measurement elements. The associated measurement data is transmitted to the open-loop and closed-loop control system 14, which then activates the actuator 5. In this possibility, the open-loop and closed-loop control system 14 can be used to influence the previously determined measurement signal. For example, in the case of a low amplitude of the current oscillation, the amplitude can be increased or reduced with the aid of the open-loop and closed-loop control system 14 before the activation of the actuator 5.

The internal combustion engine 13 comprises a first cylinder bank 24 and a second cylinder bank 25. The first and second cylinder banks 24 and 25 have a multiplicity of cylinders, comprising inlet ducts and outlet ducts. The ducts are opened and closed by a working cycle using inlet valves and outlet valves. On the inlet side, these inlet ducts are connected to the intake section 23 so that they can be flowed through. The intake section 23 comprises an air filter and a charge air cooler.

On the exhaust side, the outlet ducts are connected to the exhaust tract of the internal combustion engine 13, via which exhaust tract fuel mixture that is burnt in the cylinders can flow into the surroundings. This exhaust tract usually comprises a silencer in addition to an emission reduction unit such as a particle filter or a catalytic converter. During the operation of the internal combustion engine 13, a sound that is characteristic of this internal combustion engine 13 is brought about, inter alia, by a corresponding configuration of the intake section 23 and the exhaust tract.

What is claimed is:

1. A sound transmitting system for transmitting a sound from a motor vehicle drive assembly to a passenger compartment or an external region of a body work of the motor vehicle, the sound transmitting system comprising:
   a sound generator having a housing with opposite first and second ends and a diaphragm in the housing and dividing the housing into a first chamber between the diaphragm and the first end of the housing and a second chamber between the diaphragm and the second end of the housing, and an actuator operative to excite the diaphragm and cause the diaphragm to oscillate;
   an open-loop and closed-loop control system connected to the drive assembly and to the actuator of the sound generator in a signal-transmitting fashion, the open-loop and closed-loop control system receiving a signal from the drive assembly relating to operating parameters of the drive assembly and transmitting a signal to the actuator of the sound generator and causing the diaphragm to oscillate and generate the sound in the first and second chambers based on the signal from the control system;
   a sound-conducting first sound duct having a proximal end connected to the first chamber of the housing of the sound generator and a distal end spaced from the proximal end and communicating with a first location in the passenger compartment, the first sound duct having a first length extending between the distal and proximal ends, a first diameter, and a first cross-sectional area; and
   a sound-conducting second sound duct having a proximal end connected to the second chamber of the housing of the sound generator and a distal end spaced from the proximal end and communicating with a second location in the passenger compartment spaced from the first location in the passenger compartment, the second sound duct having a second length extending between the distal and proximal ends, a second diameter, and a second cross-sectional area, wherein
   at least one of the first length, the first diameter and the first cross-sectional area of the first sound duct is different than at least one of the second length, the second diameter and the second cross-sectional area of the second sound duct so that transmission and frequency characteristics of the sound transmitted by the first sound duct is different than transmission and frequency characters of the sound transmitted by the second sound duct, and
   the sound generator and the first and second sound ducts are mechanically isolated from the drive assembly.

2. The sound transmitting system of claim 1, wherein the open-loop and closed-loop control system is connected to a bus.

3. The sound transmitting system of claim 1, further comprising a measuring element connected to the open-loop and closed-loop control system to absorb oscillations of an intake section and/or of an exhaust tract of a drive assembly of the motor vehicle.

4. The sound transmitting system of claim 1, further comprising a characteristic diagram formed in the open-loop and closed-loop control system to activate the actuator.

5. The sound transmitting system of claim 1, wherein the sound duct is formed from a plastic.

6. The sound transmitting system of claim 1, wherein the distal ends of the first and second sound ducts open into the passenger cell of the motor vehicle.

7. The sound transmitting system of claim 1, wherein the distal ends of the first and second sound ducts further communicate with the external region.

8. The sound transmitting system of claim 1, wherein the sound generator is manufactured from a plastic.

9. The sound transmitting system of claim 1, wherein the first chamber and the second chamber have different volumes.

* * * * *